United States Patent [19]

Takai

[11] Patent Number: 5,239,326
[45] Date of Patent: Aug. 24, 1993

[54] FILM-LOADED DISPOSABLE CAMERA

[75] Inventor: Tsunemasa Takai, Takarazuka, Japan

[73] Assignee: Kabushiki Kaisha Senshukai, Osaka, Japan

[21] Appl. No.: 741,618

[22] Filed: Aug. 7, 1991

[51] Int. Cl.⁵ ............................................. G03B 17/00
[52] U.S. Cl. ..................................................... 354/286
[58] Field of Search ........................ 354/286, 295, 296

[56] References Cited

U.S. PATENT DOCUMENTS 2,674,932  4/1954  Tydings et al. ................. 354/295 X
4,961,085  10/1990  Cho et al. ............................ 354/295

Primary Examiner—Michael L. Gellner
Assistant Examiner—Howard B. Blankenship
Attorney, Agent, or Firm—Wenderoth, Lind & Ponack

[57] ABSTRACT

The present invention provides a film-loaded disposable camera so structured that a lens frame with an auxiliary lens is detachably mounted on the camera body to enable the lens frame to be exchanged or interchanged with other lens frames with different types of lenses as desired, such as a normal lens, a wide-angle lens, a telephoto lens, a fish-eye lens, and a contact-photo lens. Thus, different kinds of photographs may be taken as desired by using the desired types of lenses with a single camera body.

8 Claims, 2 Drawing Sheets

FILM-LOADED DISPOSABLE CAMERA

BACKGROUND OF THE INVENTION

1. Field of the Invention

The present invention relates to a film-loaded disposable camera and, more specifically, to an improved type of such camera in which a lens part is removably or detachably mounted on the camera body so that it may be exchanged with different kinds of lenses as desired, to enable not only different kinds of photographs to be taken with a single camera on a single roll of film loaded therein but also to save the lenses of such camera for repetitive use instead of being discarded as with the known type of such camera.

2. Description of the Related Art

The known type of film-loaded disposable camera has in each case been provided with a single pre-set or specific photographic function. For example, each individual camera is provided only with the function of taking normal photographs or telescopic photographs, but not both kinds of photographs. There is another type of such camera which is provided with the combined function of taking normal and contact photographs, but in this case too, such function is pre-set for each individual camera and cannot be changed later.

Also, with the known type of disposable camera, a lens part is discarded together with the camera body when the loaded film is used up and taken out of it for development. By providing such camera with a removable or detachable lens part, thus permitting the exchange of its lens part, it will become possible to not only save the lens for repetitive use but to also take telephotograph and normal photograph or other kinds of photographs with the same disposable camera.

Furthermore, with the known type of disposable camera which is provided with a single specific photographic function, when a person carrying such camera on his trip desires to photograph an object whose distance from the camera position varies, namely, far or close, it will be necessary for him or her to carry more than one or two of such cameras with different photographic functions such as wide angle, telescopic, close-contact or perhaps fish-eye lenses, in order to satisfy his or her desire. However, it will be very inconvenient to carry numerous disposable cameras and use them according to the desired functions in a particular situation. On the other hand, ordinary cameras with wide-angle, telescopic or fish-eye photographic functions are rather expensive as compared with ordinary disposable cameras and, therefore, are not easily affordable.

There has been a particular desire for a type of disposable camera, therefore, with which one can take different kinds of photographs on one single roll of loaded film conveniently and economically.

SUMMARY OF THE INVENTION

It is, therefore, the object of the present invention to overcome the abovementioned problems encountered with the known type of disposable camera.

According to the present invention, there is provided a film-loaded disposable camera comprising a lens part which is detachable from the camera body so as to be exchanged with different types of lenses as desired, such as a normal lens, a wide-angle lens, a telephoto lens, a fish-eye lens, and a contact lens, thus saving expensive lenses from being discarded and enabling them to be used repeatedly and at the same time permitting different kinds of photographs to be taken on a roll of film loaded in one single disposable camera.

The disposable camera according to this invention is characterized by a structure in which a lens frame with an auxiliary lens optically adapted or coordinated for use with a master lens on the camera body is detachably mounted onto the camera body by means of a detaching means interposed between the front side of the camera body and the lens frame.

DETAILED DESCRIPTION OF THE INVENTION

Figure 1:
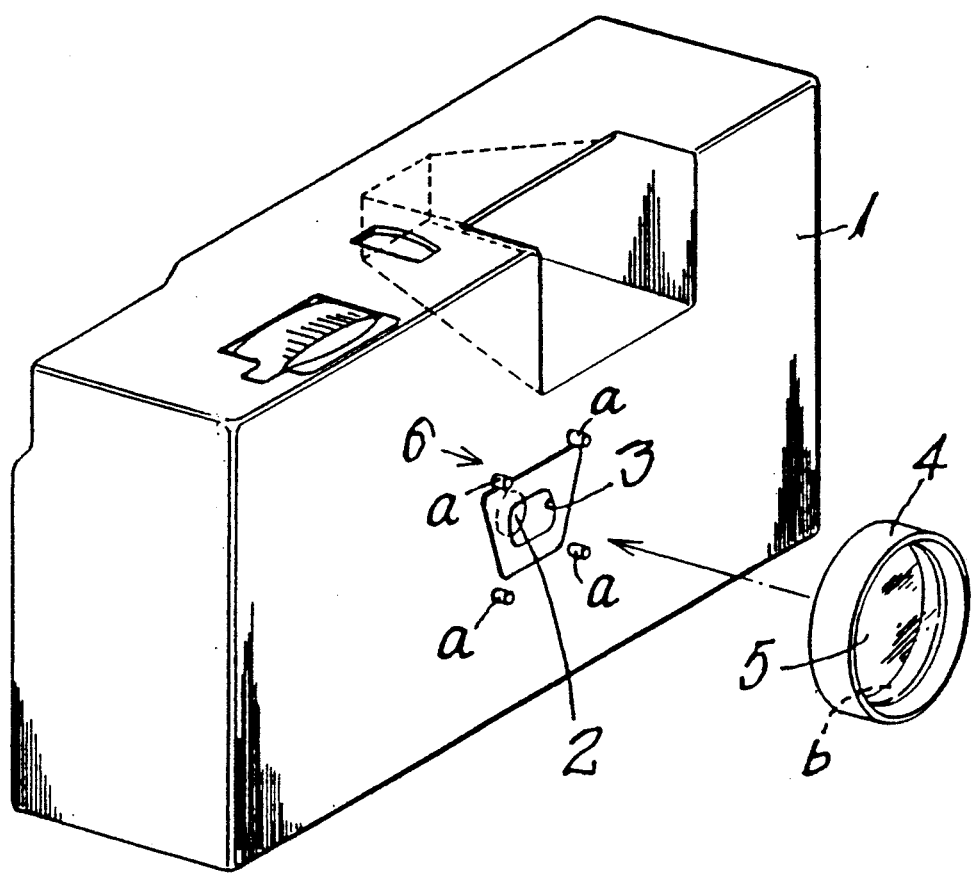
FIG. 1 is an exploded view in perspective of a first embodiment of the present invention.

In the drawings, the numeral 1 indicates the body of a disposable camera according to the present invention, in which a roll of film is loaded ready for photographing action just as in the case of the known type of disposable camera. The numeral 2 indicates a master lens rigidly provided inside a photo opening 3 which is in turn provided on the front side of the camera body 1 at its center. The numeral 4 indicates a lens frame carrying a desired exchange lens 5 adapted for use with the master lens 2 and the numeral 6 a detatching means provided between the front side of the camera body 1 and the lens frame 4.

The present invention will now be described with reference to the accompanying drawings:

In the first embodiment shown in FIG. 1, the detaching means 6 comprises four latch pins a protrudingly provided on the periphery of the opening 3 and the inner peripheral side b of the lens frame 4 whose inner periphery is formed so as to elastically contact said latch pins a from outside.

Figure 2:
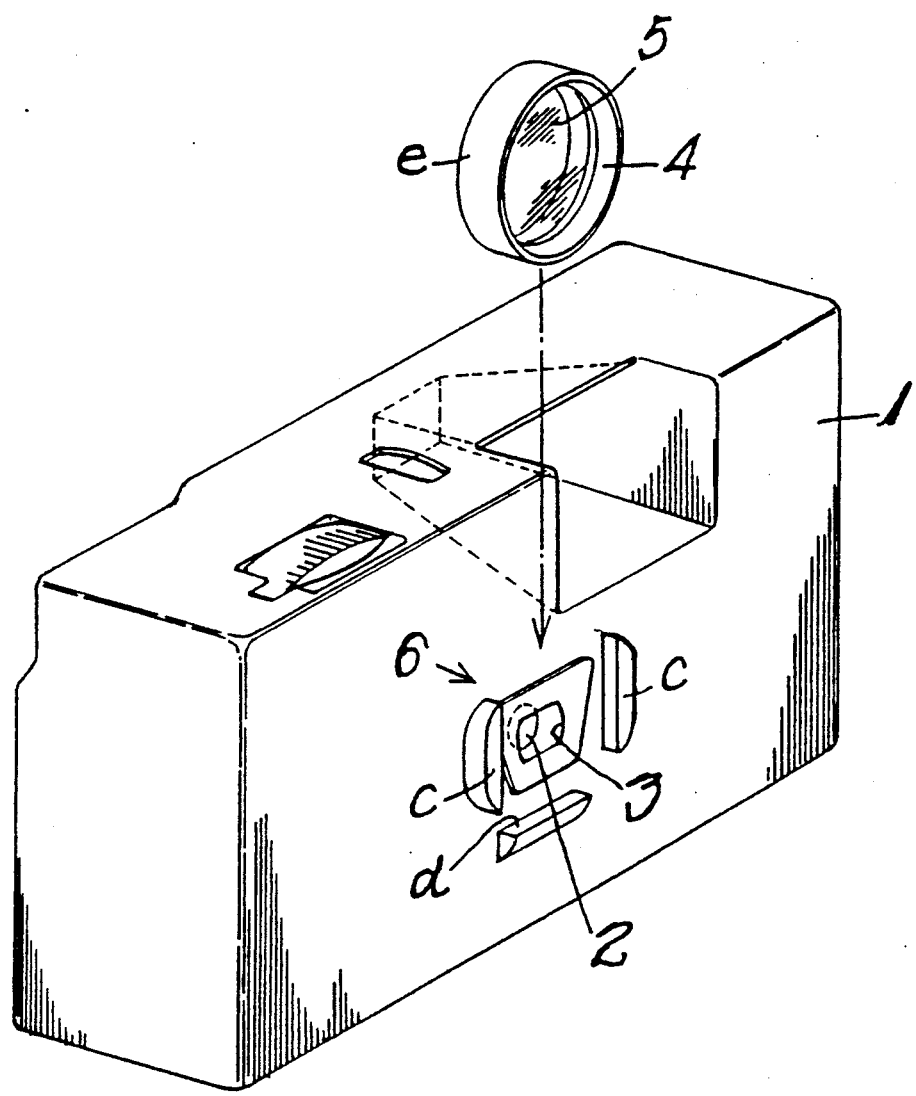
FIG. 2 is an exploded view in perspective of a second embodiment of the present invention.

In the second embodiment shown in FIG. 2, the detaching means 6 comprises a pair of vertically-disposed protuberances c provided on mutually opposite sides of the opening 3, a latch protuberance d formed laterally on the lower part of the camera body 1 at a position below the opening 3, and the outer peripheral side e of the lens frame 4 whose outer periphery is formed so as to tightly engage between the vertically-disposed protuberances.

With the abovementioned structure of the detaching means 6 in the first embodiment, in order to replace the auxiliary lens 5 on the camera body 1 with any other auxiliary lens desired, the lens frame 4 is removed from the camera body 1 by manually pulling it out of its engagement with the four latch pins a and then another lens frame with any desired auxiliary lens is set on the camera body 1 by manually pushing it against the camera body 1 until the lens frame comes in tight contact with the four latch pins a so as to optically align such desired exchange lens to the master lens 2 of the camera body.

In the second embodiment, the auxiliary lens 5 is held in position by and between two oppositely-located vertical protuberances c and the lateral protuberance d. To replace the auxiliary lens 5 with any other auxiliary lens desired, the lens frame 4 is removed by manually pulling it out of its engagement with the vertical protuberances c and lateral protuberance d and then, another lens frame with any desired auxiliary lens is set on the camera body 1 by manually pushing it against the camera body 1 until the lens frame engages tightly between the vertical protuberances c and lateral protuberance d so as to actually align such desired auxiliary lens with the master lens 2.

Needless to say, the disposable camera according to the present invention can make use of several lens frames with different types of auxiliary lenses depending on the objects to be photographed, as long as such lens frames are formed to fit in with the detaching means 6 on the camera body 1. Therefore it becomes possible to take many different kinds of photographs with one camera body on one roll of film.

Also, it is needless to say that the above-mentioned detaching means for lens exchanging purposes is not limited to the given examples in form and shape but may vary without deviating from the spirit of the invention.

EFFECTS OF THE INVENTION

The effects of the present invention are as follows:

According to the disposable camera of the present invention, one can take many kinds of photographs with only one camera through different photographing methods, as so far described. The present invention provides additional advantages. For example, since the auxiliary lenses employed therein can be used repeatedly, they no longer need to be thrown away as was the case with the conventional disposable cameras. One may only need to buy a camera body equipped only with a master lens, but not a complete camera with a master lens and a lens frame pre-set for each specific function, thereby rendering the use of a disposable camera less costly than when using the conventional disposable camera. Also, in photographing objects at different distances, one previously had to carry and use more than one disposable camera; for example, one pre-set with a normal lens and another one with a telephoto lens and/or one more with a wide-angle lens, but according to the disposable camera according to the present invention, one need only carry and use one camera body with some auxiliary lens frames, thus making its use convenient as compared with the case of the conventional disposable cameras.

What is claimed herein is:

1. A film-loaded disposable camera comprising:
   an auxiliary lens unit including an auxiliary lens frame and an auxiliary lens fixed in said lens frame;
   a disposable camera unit including a camera body having a photo opening formed in a front face thereof, a master lens mounted in said camera body in alignment with said photo opening, and a mounting means fixed to said front face of said camera body about a periphery of said photo opening for detachably mounting said auxiliary lens unit to said camera body in alignment with said master lens; and
   wherein said mounting means comprises a plurality of projections fixed to said front face of said camera body about the periphery of said photo opening and projecting forwardly from said front face.

2. A film-loaded disposable camera as recited in claim 1, wherein
   said plurality of projections comprises a plurality of latch pins, said auxiliary lens frame of said auxiliary lens unit being elastically and detachably engageable about said plurality of latch pins.

3. A film-loaded disposable camera as recited in claim 1, wherein
   said plurality of projections comprises a pair of vertically elongated protuberances fixed to said front face on opposing sides of said photo opening, said auxiliary lens frame of said auxiliary lens unit being tightly engageable between said vertically elongated protuberances.

4. A film-loaded disposable camera as recited in claim 3, wherein
   said plurality of projections further comprises a laterally elongated latch protuberance fixed to said front face below said photo opening.

5. A film-loaded disposable camera for use with exchangeable auxiliary lens units respectively having auxiliary lens frames and auxiliary lenses fixed in said lens frames, said camera comprising:
   a camera body having a photo opening formed in a front face thereof;
   a master lens mounted in said camera body in alignment with said photo opening;
   a mounting means for detachably mounting one of the exchangeable auxiliary lens to said camera body in alignment with said master lens; and
   wherein said mounting means comprises a plurality of projections fixed to said front face of said camera body about a periphery of said photo opening and projecting forwardly from said front face.

6. A film-loaded disposable camera as recited in claim 5, wherein
   said plurality of projections comprises a plurality of latch pins.

7. A film-loaded disposable camera as recited in claim 5, wherein
   said plurality of projections comprises a pair of vertically elongated protuberances fixed to said front face on opposing sides of said photo opening.

8. A film-loaded disposable camera as recited in claim 7, wherein
   said plurality of projections further comprises a laterally elongated latch protuberance fixed to said front face below said photo opening.

* * * * *